Patented Apr. 8, 1930

1,754,070

UNITED STATES PATENT OFFICE

HERMANN WAGNER, OF BAD SODEN-ON-THE-TAUNUS, ERWIN HOFFA, ERNST RUNNE, ERWIN THOMA, AND HANS HEYNA, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFF

No Drawing. Application filed July 5, 1927, Serial No. 203,672, and in Germany July 9, 1926.

The present invention relates to the manufacture of new azo dyestuffs and to the process of preparing the same.

Certain aromatic amines, particularly the halogen-ortho-toluidines, are especially useful in producing good dyestuffs by coupling a diazotized aromatic amine with a 2-hydroxy-naphthalene-3-carboxylic acid arylide, whether used as the amine diazotized or as the amine in the acid arylide.

By the present invention certain halogen xylidines are used for making dyestuffs of this kind, namely the 1.3-dimethyl-4-amino-6-halogenbenzenes and the 1.3-dimethyl-4-amino-2.6-dihalogen-benzenes, it having been found that the dyestuffs produced with their aid are of especially good properties.

Furthermore, by the present invention dyestuffs of equally excellent properties as to fastness are made by using a diazotized body which differs from that named above only in that in place of the 6-halogen atom there is a hydrogen atom or an alkyl group.

These dihalogen bases were hitherto unknown. They can be prepared for instance by halogenating unsymmetrical meta-xylidine in sulfuric acid or the like. It may be assumed that during the reaction the two halogen atoms enter the 2.6-positions.

The dyestuffs in question can be produced from the bases and the arylides of the 2-hydroxynaphthalene-3-carboxylic acid in the usual manner either on the fiber or in substance or on a substratum.

When the dyestuffs are produced on the fiber as described for instance in U. S. A. patent specification No. 1,622,690, dated March 29, 1927, the said halogen xylidines yield azo dyestuffs of excellent properties, particularly as regards fastness to light, chlorine and kier-boiling.

Thus, bright yellowish or pure red tints of very good fastness to kier-boiling are obtained by coupling, for instance, the diazo compound of 1.3-dimethyl-4-amino-6-chlorobenzene with the 5'-chloro-2'-methoxy-1'-anilide or the 4'-chloro-2'-methyl-1'-anilide or the β-naphthalide of 2-hydroxynaphthalene-3-carboxylic acid.

The dyestuffs made by coupling 1.3-dimethyl-4-amino-6-bromobenzene with the said arylides are very similar to the dyestuffs obtainable from the chloro-derivative.

The diazo compound of 1.3-dimethyl-4-amino-2.6-dichlorobenzene yields on the fiber, when coupled with the ortho-toluidide or the 5'-chloro-2'-methoxy-1'-anilide of 2-hydroxynaphthalene-3-carboxylic acid, a red shade; when coupled with the 4'chloro-2'-methyl-1'-anilide of the said acid a scarlet shade is obtained, when coupled with the β-naphthalide of the said acid a claret-red shade with a yellow hue is obtained, and so on. All these dyeings are remarkably fast to kier-boiling.

The following examples illustrate the invention, but they are not intended to limit it:

1. Cotton material is treated in known manner with a grounding liquor prepared from 10 kilos of 2-hydroxynaphthalene-3-carboxylic acide-4'-chloro-2'-methyl-1'-anilide, 20 liters of sodium Turkey red oil of 50 per cent strength, 20 liters of caustic soda solution of 34° Bé. and 500 liters of hot water, the whole made up with water to 1000 liters. The dyeing is then developed with a diazo-solution prepared as follows:—

3.8 kilos of 1.3-dimethyl-4-amino-6-chlorobenzene-hydrochloride are diazotized with 5.2 liters of hydrochloric acid of 22° Bé. and 1.44 kilos of sodium nitrite dissolved in water. After the diazotization is complete the whole is neutralized with 4 kilos of sodium acetate dissolved in water until it shows a neutral reaction towards Congo paper. After washing and soaping at the boil the dyeing shows a middling red shade of very good properties as to fastness. It has the probable formula:

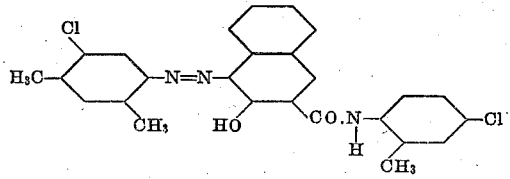

2. Cotton material is padded in the usual manner with a grounding liquor prepared from 12 kilos of 2-hydroxynaphthalene-3-carboxylic acid-2'-methyl-4'-chloro-1'-anilide, 36 liters of caustic soda solution of 34°

Bé., 24 liters of sodium Turkey red oil of 50 per cent strength and 500 parts of hot water, the whole being made up with water to 1000 liters. The dyeing is then developed with a diazo solution prepared as follows:—

3.1 kilos of 1.3-dimethyl-4-amino-2-chlorobenzene are mixed, while stirring, with 5.2 liters of hydrochloric acid of 22° Bé. and ice-cold water, and to this mixture are added 1.44 kilos of sodium nitrite dissolved in water. After the diazotization is complete, the whole is made up with cold water to 1000 liters and neutralized with sodium acetate until it shows a neutral reaction towards Congo paper. When washed and soaped at the boil the dyeing shows a bluish-red tint of very good fastness to kier-boiling and to chlorine. It has the probable formula:

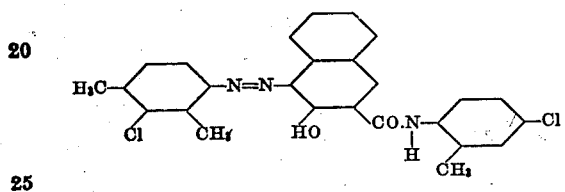

The 1.3-dimethyl-4-amino-2-chlorobenzene can be made by nitrating 1.3-diemthyl-2-amino-benzene to 1.3-dimethyl-2-amino-4-nitrobenzene; the amino group of the latter is replaced according to Sandmeyer's method by chlorine and the product is reduced for instance by the action of iron and a small quantity of hydrochloric acid.

3. Cotton material is impregnated in known manner with a grounding liquor prepared from 10 kilos of 2-hydroxynaphthalene-3-carboxylic acid-α-naphthalide, 20 liters of sodium Turkey red oil of 100 per cent strength, 30 liters of caustic soda solution of 34° Bé., dissolved at the boil with 500 liters of water, the whole being made up with water to 1000 liters. The dyeing is then developed with a diazo-solution prepared as follows:—

4.5 kilos of 1.3-dimethyl-4-amino-2.6-dichlorobenzenehydrochloride are diazotized in the cold with 6 liters of hydrochloric acid of 22° Bé. and 1.44 kilos of sodium nitrite dissolved in water. To the diazo-solution thus prepared are added 2.5 kilos of sodium bicarbonate dissolved in water and then a solution of sodium acetate until it shows a neutral reaction towards Congo paper. After washing and soaping at the boil the dyeing shows a bluish-red tint of very good properties as to fastness. It has the probable formula:

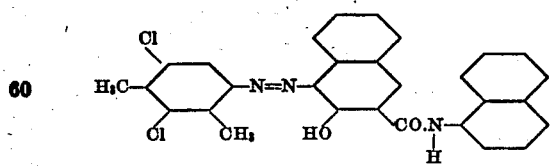

4. By substituting for the 1.3-dimethyl-4-amino-2-chlorobenzene as used in Example 2, 3.4 kilos of 1.3.6-trimethyl-4-amino-2-chlorobenzene, there is likewise obtained a bluish-red tint of very good fastness to kier-boiling and to chlorine. The dyestuff has the probable formula:

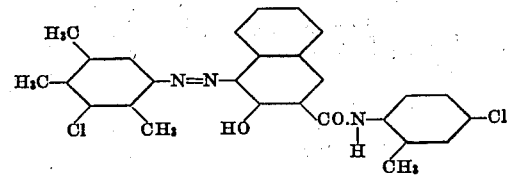

The 1.3.6-trimethyl-4-amino-2-chlorobenzene can be prepared by chlorinating 1.3.6-trimethyl-4-aminobenzene in sulfuric acid. Recrystalized from petroleum ether, it has the melting point of 66° C. to 67° C.

We claim:

1. As new products azo dyestuffs having the general formula:

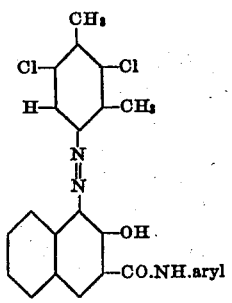

which dyestuffs may be produced on the fiber and yield very fast red tints.

2. As a new product the azo dyestuff having the general formula:

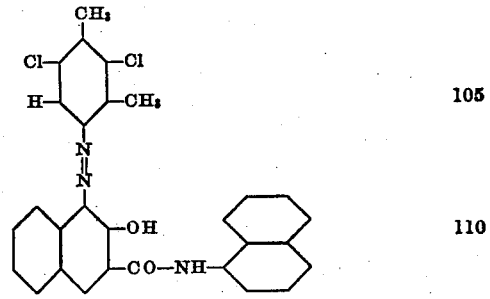

which dyestuff may be produced on the fiber and yields very fast red tints.

3. As new products, azo dyestuffs having the general formula:

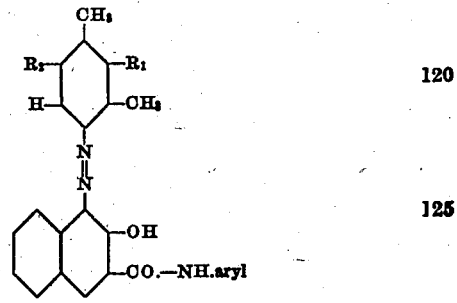

wherein $R_1$ stands for halogen, $R_2$ stands for hydrogen, alkyl or halogen, which dyestuffs may be produced on the fiber and yield very fast red tints.
4. As new products, azo dyestuffs having the general formula:
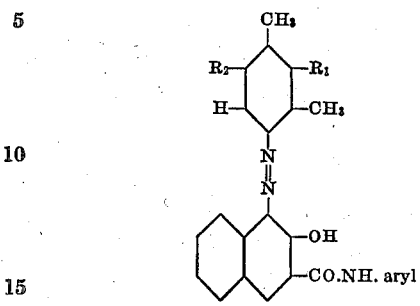
wherein $R_1$ stands for halogen, $R_2$ stands for alkyl or halogen, which dyestuffs may be produced on the fiber and yield very fast red tints.
In testimony whereof, we affix our signatures.
HERMANN WAGNER.
ERWIN HOFFA.
ERNST RUNNE.
ERWIN THOMA.
HANS HEYNA.